May 6, 1958

L. A. HAUTAU ET AL 2,833,321

TWO-STAGE TORQUING MACHINE FOR FASTENERS

Filed May 4, 1953

INVENTOR.
LLEWELLYN A. HAUTAU
CHARLES F. HAUTAU
BY
*Thos S Donnelly*
Attorney

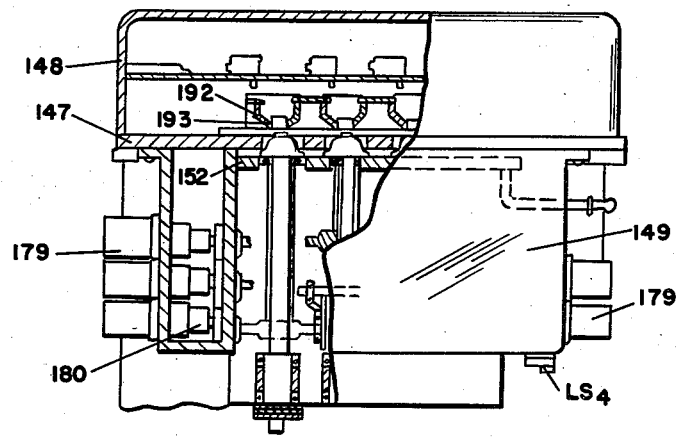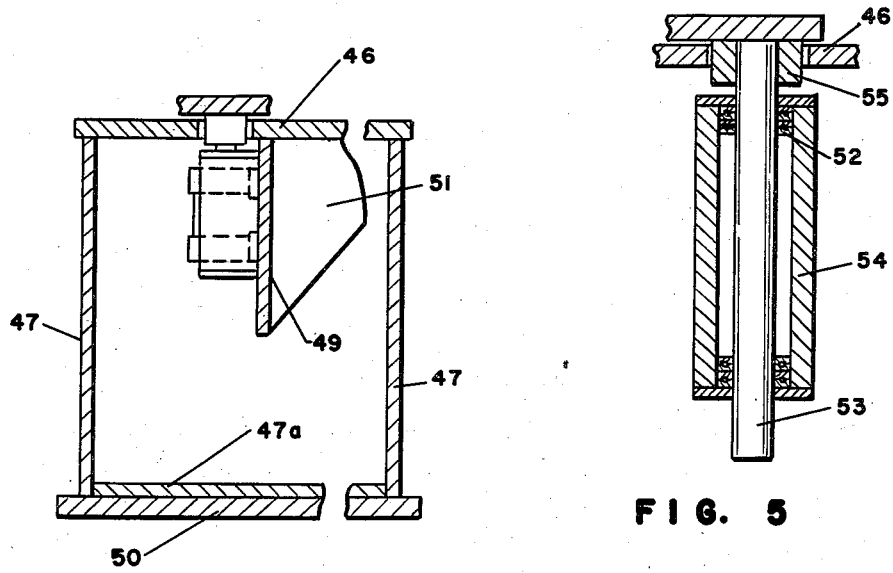

INVENTORS
LLEWELLYN A. HAUTAU
CHARLES F. HAUTAU

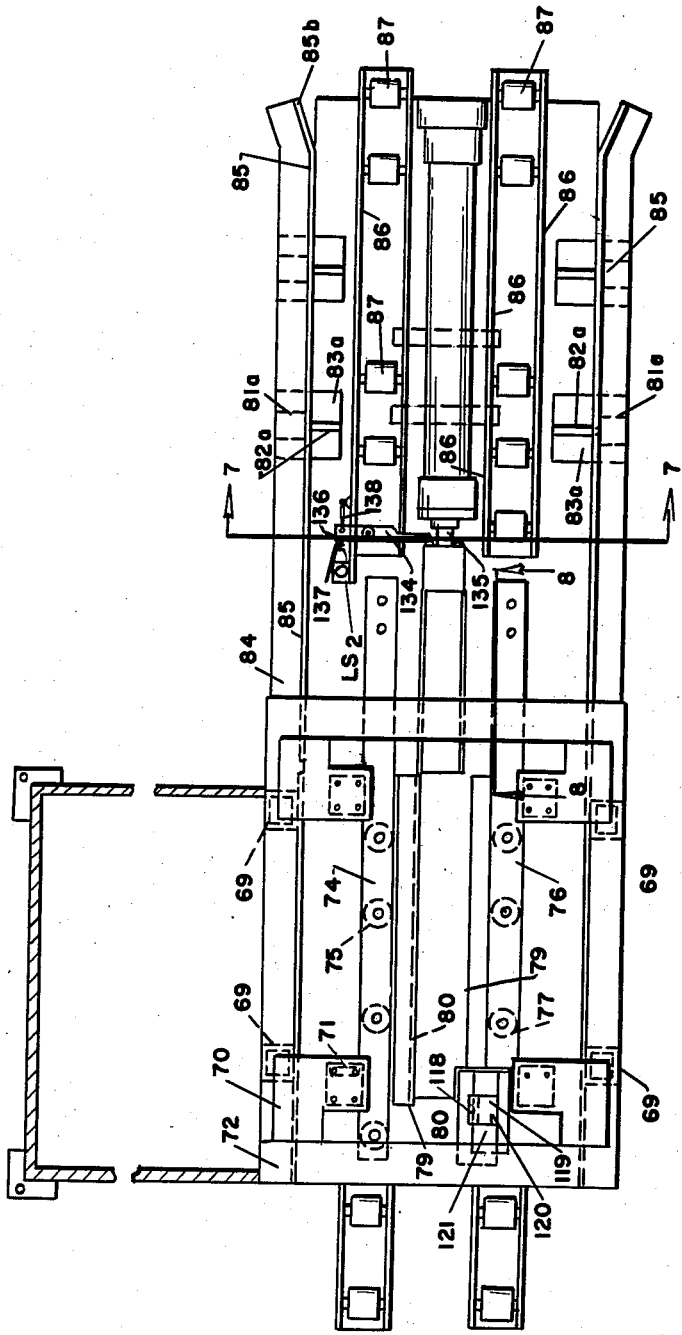

May 6, 1958
L. A. HAUTAU ET AL
2,833,321
TWO-STAGE TORQUING MACHINE FOR FASTENERS
Filed May 4, 1953
11 Sheets-Sheet 6
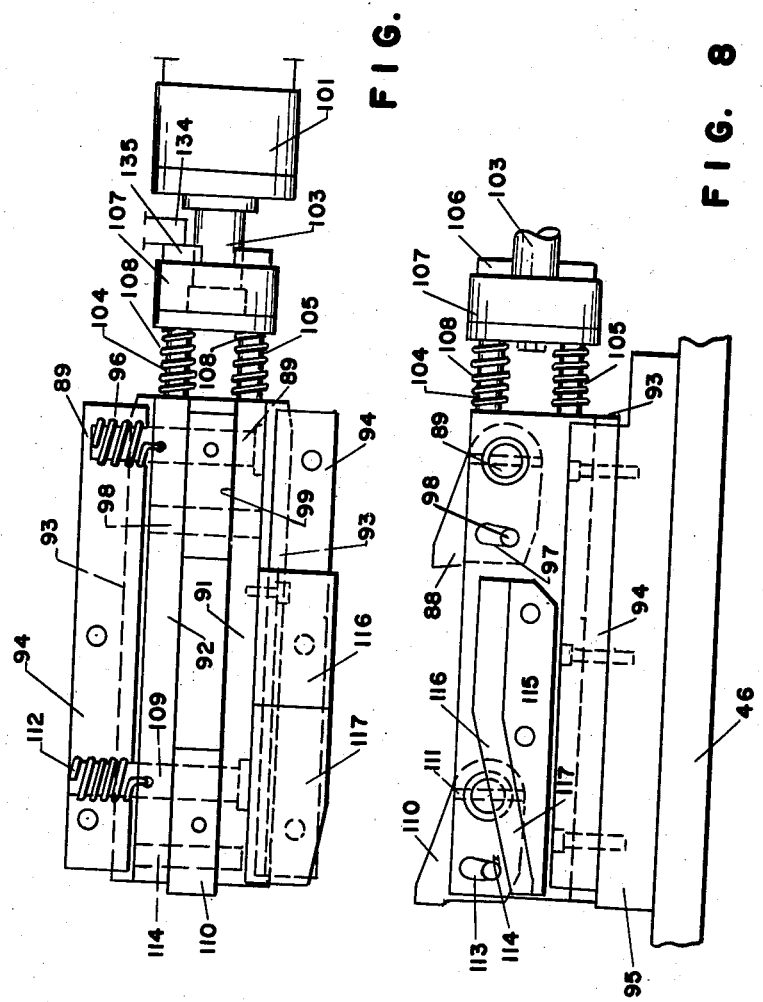
INVENTOR.
LLEWELLYN A. HAUTAU
CHARLES F. HAUTAU
BY
Attorney

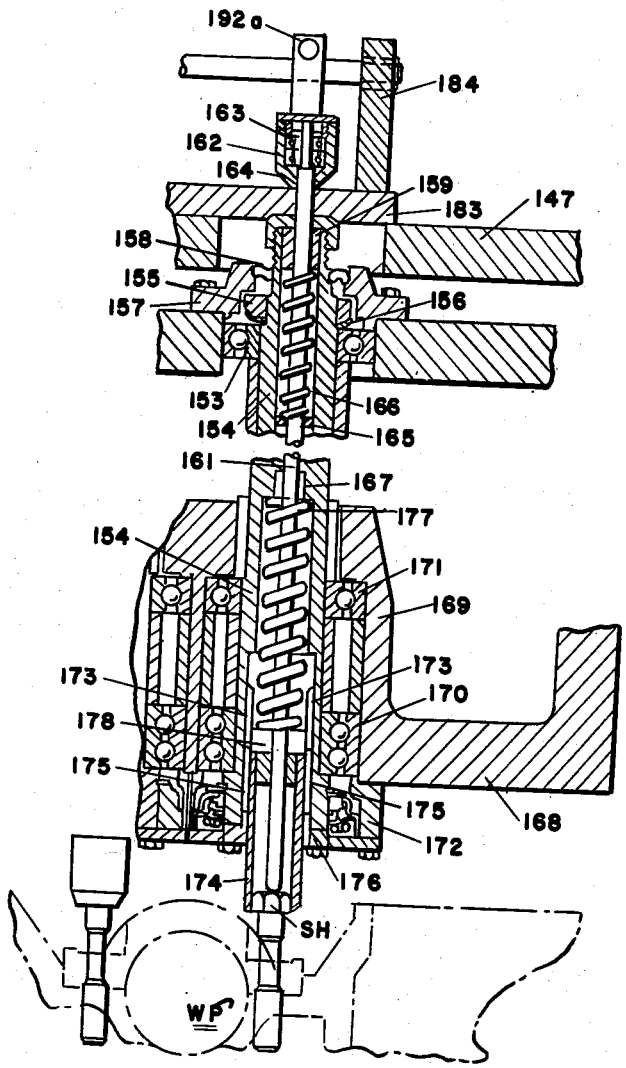
FIG. 10
INVENTOR.
LLEWELLYN A. HAUTAU
CHARLES F. HAUTAU
BY
Attorney May 6, 1958 L. A. HAUTAU ET AL 2,833,321
TWO-STAGE TORQUING MACHINE FOR FASTENERS
Filed May 4, 1953 11 Sheets-Sheet 9

INVENTOR.
LLEWELLYN A. HAUTAU
CHARLES F. HAUTAU
BY
ATTORNEY

May 6, 1958 L. A. HAUTAU ET AL 2,833,321
TWO-STAGE TORQUING MACHINE FOR FASTENERS
Filed May 4, 1953 11 Sheets-Sheet 11

INVENTOR.
LLEWELLYN A. HAUTAU
CHARLES F. HAUTAU
BY
Attorney

United States Patent Office 2,833,321
Patented May 6, 1958

2,833,321
TWO-STAGE TORQUING MACHINE FOR FASTENERS

Llewellyn A. Hautau and Charles F. Hautau, Detroit, Mich.

Application May 4, 1953, Serial No. 352,824

17 Claims. (Cl. 144—32)

Our invention relates to a new and useful improvement in a power operated multiple-fastener setting machine. The invention is particularly adaptable for use in production assembly machines, for automatically and rapidly seating or removing a multiplicity of fasteners such as nuts, bolts, cap screws, studs and the like.

It is an object of the present invention to provide a machine of this type which may automatically and rapidly seat or remove fasteners such as described.

Another object of the invention is the provision of a machine of this class having a stationary work head and provided with means to raise and lower the work-piece into and out of engagement with the work head.

Another object of the invention is to provide in a machine of this class means for rapidly moving the part operated upon toward seating position and, upon approach of the member operated upon to seating position, effecting a slower rotation of the same with a greater torque.

Another object of the invention is the provision of a mechanism for, upon seating of the member operated upon, releasing the torquing strain on the same prior to removal of the workpiece away from the torquing mechanism.

Another object of the invention is to provide a transfer mechanism for transferring the workpiece from a conveyor into position for operation and, after the torquing operation, transferring the workpiece on to another conveyor.

Another object of the invention is the provision of a mechanism which may be interposed between a pair of aligned conveyors and adapted to receive the workpiece from one conveyor and, after the torquing operation, discharge the workpiece on to another conveyor.

Another object of the invention is the provision of a machine of this class of a multiple spindle construction for torquing the part to be operated upon and obtaining in the final torquing operation a uniform torque pressure on each of the articles operated on.

Other objects will appear hereinafter.

It is recognized that various modifications and changes may be made in the detail of structure illustrated without departing from the invention and it is intended that the present disclosure be considered to be but the preferred embodiment.

Forming a part of this application are drawings in which,

Fig. 1 is a front elevational view of the invention with parts broken away and parts shown in section.

Fig. 2 is a fragmentary view of a part of the invention shown in Fig. 1 with parts broken away and parts shown in section.

Fig. 4 is a fragmentary sectional view taken on line 4—4 of Fig. 1.

Fig. 5 is a fragmentary sectional view taken on line 5—5 of Fig. 1.

Fig. 6 is a view taken on line 6—6 of Fig. 1.

Fig. 8 is an enlarged sectional view taken on line 8—8 of Fig. 6.

Fig. 9 is a top plan view of the structure shown in Fig. 8 and taken on line 9—9 of Fig. 1.

Fig. 10 is a longitudinal central sectional view through one of the spindles with parts broken away and taken on line 10—10 of Fig. 1.

Figure 3:
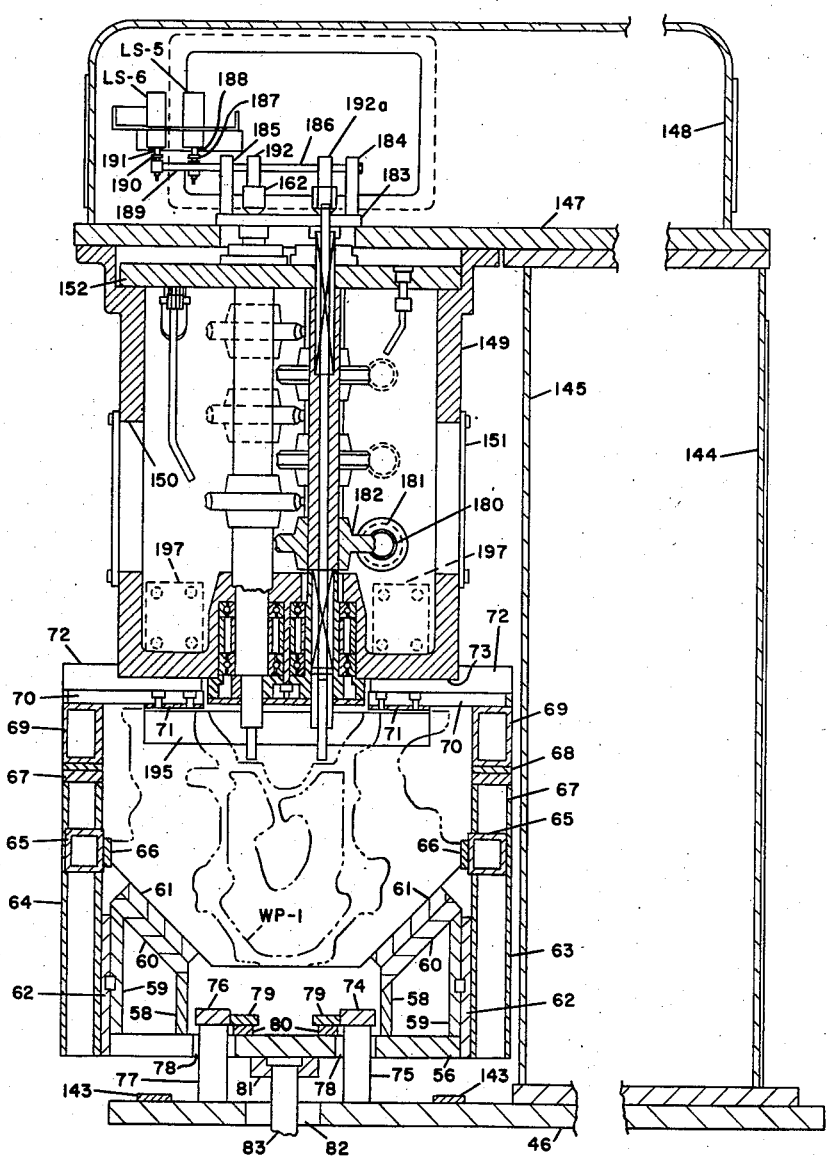
Fig. 3 is a sectional view taken on line 3—3 of Fig. 1, with parts broken away.

In the embodiment and operation of the machine illustrated, we have shown the invention used for threading a plurality of screws into an engine block but, from the description given, it is believed that it will appear obvious that the invention may be used for many various types of operations.

Briefly described, the workpiece or engine block will travel on a conveyor until it reaches the machine which forms the present invention. It will travel from the conveyor on to a slide and it is then moved along this slide by a hydraulic mechanism onto a cradle. When reaching the cradle, the hydraulic mechanism moving the part onto the cradle, will be rendered inoperative. The cradle is positioned beneath the torquing mechanism. Upon positioning of the workpiece on the cradle, another hydraulic mechanism is actuated which serves to elevate the workpiece into a position in which the nuts, or heads of screws, or other articles operated on, may engage a rotating socket or wrench. These sockets or wrenches are constantly rotating. The sockets or wrenches are rotating at a slow speed and low torque and the rotation is effected by fluid motors, each spindle having its own motor for driving it. As soon as the part to be operated upon has properly seated in the wrench or socket, a switch is closed and immediately the motors driving the spindles are turned into high speed.

This high speed will continue until the screw torqued or other article operated upon approaches the limit of movement whereupon a trip is met which will reduce the speed of the fluid motor and change it from a low torque, high speed condition to a low speed, high torque condition. The operation will continue until the article being operated upon or driven reaches its ultimate position of movement whereupon the torque resistance will increase to the extent that the fluid motor driving the rotating spindle is subjected to such a resistance that it will be stalled. When all of the motors are stalled, other mechanism is set into operation which will release the tension of the rotated mechanism on the article to be rotated by a slight reverse rotation. Instantaneously with the release of the friction by this slight rotation, the elevated cradle is lowered into a position for the passage of the work piece therefrom onto another slide from which it may be conducted to a conveyor, the cradle being then in a position for reception of another workpiece.

These operations are all automatic in the present disclosure although, if desired, some of the operations, or all of them, might be manually controlled.

Of course, when the workpiece moves into position for being operated upon by the torque mechanism, it is guided into the proper position so that the spindle will be in alignment with the parts to be operated upon and securely held in the alignment position during the torquing operation.

To accomplish this, we have provided a base 46 supported on a suitable supporting body, such as the floor or the like, by walls 47, which are connected by a bottom plate 47a to which are welded, or otherwise suitably secured, the leveling plates 50. Depending from the base 46 is a ledge 49 from which extend the securing or bracing brackets 51, which are shown in Fig. 1 and Fig. 2.

Secured to and carried by the ledge 49 are the housings 54 in which are positioned the ball bushings 52 which serve as a guide for the stems 53 which are secured to the blocks 55. These blocks 55 are secured by the bolts 57 to the baseplate 56 of the cradle.

Welded to the upper surface of the base plate 56, as shown in Fig. 3, are plates 58, there being a pair of these plates, spaced apart to provide a cradle. Secured to the base plate 56 and extending upwardly and from the opposite sides are the plates 59 and these plates 59 are connected to the plates 58 by the plates 60 which are welded thereto. These plates 60 serve as a support for the inclined, hardened, wear-resistant plates 61 which serve to engage the bottom faces of the workpiece WP. On this workpiece we have illustrated screws to be driven, or torqued, each having a head SH.

Extending upwardly from the upper surface of the bottom plate 56 of the cradle are the plates 62 which are secured to the plates 59. These plates are engaged at one of their faces at the opposite sides by the upwardly projecting tubes 63 and 64 which are connected intermediate their ends by the tubes 65, each of which carries on its face a slide or guide plate 66 adapted for engaging opposite sides of the workpiece WP, as shown in Fig. 3. Secured to the upper ends of each of the tubes 63 and 64 is a plate 67, spaced by the plate 68 from the horizontally extended tube 69. Rested upon and secured to the upper face of this tube 69 is a plate 70 to which is secured by bolts, or in any other suitable manner, the contact plates 71 which are adapted to contact the upper surface of the workpiece WP upon positioning of the workpiece WP in the cradle.

Mounted on and secured to the plate 70 is a plate 72, having a recess 73 formed therein, and the purpose of this recess will appear as the description proceeds.

A skid plate 74 is mounted on a stud 75 which is secured to and projects upwardly from the base 46. Spaced apart from the skid plate 74 is a similar skid plate 76 mounted on the stud 77 secured to and projected upwardly from the base plate 46. As shown in Fig. 3, these studs project thru openings 78 formed in the cradle base 56 and there is a clearance between the studs 75 and 77 and the openings 78.

Mounted on the base 56 of the cradle are gib plates 79 held in spaced relation from the bottom 56 by the plates 80, the edges of which are overhung by the gib plates 79.

Secured to the bottom of the cradle base 56 is a block 81 having a recess in which engages the head of a piston rod 83 as shown in Fig. 3. This piston rod 83, as shown in Fig. 1 extends upwardly from a piston contained within a hydraulic or pneumatic cylinder 84, this cylinder 84 being fixedly mounted on the ledge plate 49. By means of the cylinder 84 and piston rod 83 the cradle may be elevated and lowered.

Projecting upwardly from the base 46 are tubes 81a, these tubes 81a being secured to the plate 83a and reinforced by the reinforcing rib 82a. Secured to the upper ends of the tubes 81a and extending longitudinally, are the tubes 84a on the inner face of which are mounted the guide or wear plates 85.

Rotatively supported on brackets 86 mounted on the upper face of the base 46 are spaced-apart rollers 87. As the WP leaves the conveyor it will pass onto these rollers 87 travelling to the left of Fig. 1. As the workpiece travels on to the rollers 87 the flared ends 85b of the guide strips 85 will serve to guide the WP into proper position so that opposite sides thereof will be engaged by the guide strips 85 which properly center it relative to the rest of the mechanism. As the WP travels on to the end-most roller 87 off of the conveyor belt, it will be moved along to the left of Fig. 6 by the pressure of succeeding workpieces. This movement will continue until the dotted line position shown in Fig. 1 is reached, as the workpiece is pushed along to the left of Fig. 1. In this travel, the pawl 88 which is pivoted at 89 will be rocked downwardly and then spring upwardly behind the flange 90 which forms a part of the workpiece. Should this flange not be present, there would be provided in the workpiece a recess or depression sufficient to provide a shoulder behind which the pawl 88 may engage.

The pivot 89 extends through the spaced-apart plates 91 and 92 which project upwardly from and are preferably formed integral with the slide plate 93 which slides between guide plates 94 which are secured to the plate 95 which is welded to the base 46 as shown in Fig. 8 and Fig. 9.

The pivot pin 89 of the pawl 88 is keyed to the pawl 88 by the pin 95. A spring 96 is connected at one end of the pivot pin 89 and at its opposite end to the guide plate 92 so as to normally maintain the dog or pawl rocked upwardly into the position shown in Fig. 8. This dog or pawl 88 is provided with an arcuate slot 97 through which extends a pin 98 which projects across the space 99 between the plates 91 and 92 so as to serve as a means for limiting upward rocking of the pawl 88 in response to the tension of the spring 96.

The workpiece is pushed into the dotted line position shown in Fig. 1 until the flange 90 engages in front of the pawl 88. Further movement of the workpiece to the left of Fig. 1 is not effected by thrust delivered thereto by succeeding workpieces. Further movement of this workpiece to the left of Fig. 1 is effected by hydraulic mechanism.

A cylinder 101, which may be either pneumatically or hydraulically operated, and we prefer to have it hydraulically operated, is provided with the mounting feet 102 which are securely fastened to the base 46 so that the cylinder 101 remains stationary. Secured to a piston in the cylinder 101, and projecting outwardly therefrom, is a piston rod 103.

Secured to and projecting outwardly from the ends of the spaced-apart plates 91 and 92 are the studs 104 and 105, each of which is provided with a head or flange 106. These studs slidably project through a head 107 to which the end of the piston rod 103 is secured. Embracing each of the studs 104 and 105 is a spring 108. The construction is such that as the piston rod 103 moves to the left of Fig. 1, the springs 108 will be compressed and serve to transmit a thrust to the slide 93 (see Fig. 8 and Fig. 9). Through the engagement of the end of the pawl 88 with the flange 90, this would move the workpiece to the left of Fig. 1, so as to center it below the operating mechanism. By having the thrust delivered through the springs 108 the pawl 88 may be moved to the left of Fig. 1. Should the workpiece be deposited with the flange 90 spaced to the left of the pawl 88 in Fig. 1, the sliding movement of the slide 93 would bring the pawl 88 into engagement with the flange, but due to delivering the thrust through the springs, there would be no shock or sudden jar resulting from the movement of the pawl 88 into an engagement with the flange or other projection 90.

Figure 7:
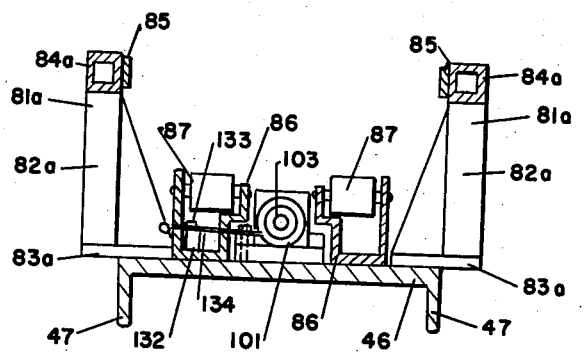
Fig. 7 is a sectional view taken on line 7—7 of Fig. 6.
Figure 12:
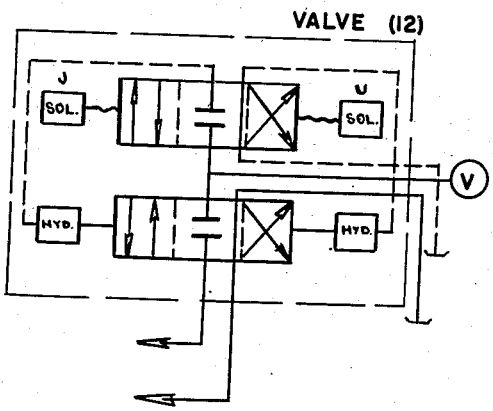
Fig. 12 and Fig. 13 are diagrammatic views of a portion of the hydraulic system.
Figure 13:
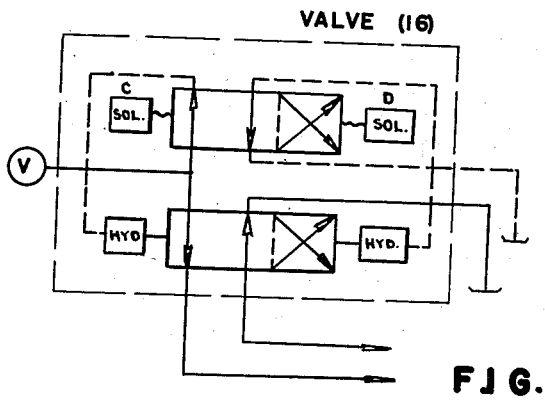

Pivotally mounted between the plates 91 and 92 (as shown in Fig. 6 and Fig. 7) on a pivot pin 109, is a pawl 110. This pivot pin 109 is keyed to the pawl 110 by the pin 111 and embracing the pivot pin 109 is a spring 112, one end of which is secured to the pivot pin 109, serving to normally maintain the pawl 110 rocked upwardly as shown in Fig. 8.

An arcuate slot 113 is formed in the plates 91 and 92 and a pin 114 carried by the pawl 110 rides in the arcuate slot 113, to limit the upward swinging movement of the pawl 110 in response to the tension of the spring 112.

Secured to the outer face of this plate 91, as shown in Fig. 6 and Fig. 7, is a cam bearing plate 115, projecting outwardly from the outer face thereof at the upper edge thereof and normal thereto is a flange 116, having the downwardly angularly turned portion 117 which serves as a cam. As the slide 93 moves to the left of Fig. 1, this flange 117 will enter the groove 118, formed on the face of the block 119.

As shown in Fig. 6, this block 119 is vertically slidable in the space 120 formed in the plate 121.

In Fig. 1 we have illustrated this block 119 in its elevated position. It has been moved to this elevated position through engagement of the flange with the groove 118. The lower position of the block 119 is illustrated in dotted lines and is particularly noticeable from the dotted line position of the groove 118, shown in Fig. 1. The workpiece which is engaged by the pawl 110 in full lines in Fig. 1 may be considered to be WP1 and to the left of this workpiece is seen in dotted lines a workpiece designated as WP2. This workpiece is engaged by the pawl 110 shown in dotted lines indicating that the pawl 110 has moved from the full line position in Fig. 1 to the dotted line position in Fig. 1. The workpiece WP1 which is the workpiece which has been operated upon by the torquing mechanism is engaged at one side by the pawl 110. This engagement takes effect immediately after the torquing operation has been completed and it is desired to slide the workpiece, WP1, to the left into the position of WP2, so as to allow workpiece WP of Fig. 1 to be moved to the left by the pressure of pawl 88 into operative position. In this movement, as the pawl 110 moves to the dotted line position, the block 119 will move upwardly as shown in Fig. 1 to serve as an abutment for the subsequent workpiece WP which has been moved into position through the thrust of the pawl 88. This indicates that the workpiece WP1 moves, subsequent to the torquing operation, from its position into the position of WP2 and at the same time the workpiece WP moves from its position into the position formerly occupied by the workpiece WP1.

As soon as workpiece WP1 is moved into position to engage the block 119, it has been moved the proper distance to the left of Fig. 1, and is now in position for the torquing operation. As soon as the workpiece WP1 engages the block 119 in its elevated position, a limit switch LS1, will be tripped and, as hereinafter described, the piston rod 103 will move to the right of Fig. 1 into its full line position, the pawls 88 and 110 being depressed on this retracting movement, so that the pawls 88 and 110 are again in the full line position shown in Fig. 1.

Mounted on and secured and projected upwardly from the base bracket 86, as shown in Fig. 7, is a spacing block 132 to which is pinned by the pivot 133 a swingable arm 134 which has its terminal portion positioned in the path of the head 135 of the stud 104 (see also Fig. 9). When the stud head 135 engages the swingable arm 134, Fig. 4, this arm 134, which is pivoted, intermediate its ends, will rock. (See Fig. 6.) The stud head 135 carried by the arm 134 will engage the stem 137 of limit switch LS-2. This arm 134 is normally maintained rocked in the opposite direction by the spring 138. When limit switch LS-2 is tripped through pressure of the thrust head 136, the hydraulic circuit will be opened to the lower end of the cylinder 84 and the exhaust to the upper end will be opened, thus causing the cradle to move upwardly.

Mounted on the cradle is a bracket 139 having an angularly turned portion 140 carrying a stud 141, the end of which is adapted to engage and trip the limit switch LS-4 upon movement of the cradle upwardly. This bracket 139 also carries a stud 142 which is adapted to engage and trip limit switch LS-3 upon downward movement of the cradle to the limit of its movement. As the cradle begins to move downwardly the limit switch LS-4 will be disengaged and the stud 142 will move toward the limit switch LS-3. There is sufficient distance between these limit switches to permit this movement. The construction is such that as the cradle engages the spaced plates 143 mounted on the table 46 (Fig. 3), the limit switch LS-3 will be engaged and tripped. The functioning and operation of these limit switches will be explained when the circuit of the mechanism is considered.

Supported on the base 46 by suitable supporting standards 144 and 145 is a plate 146 to which is attached the plate 147. Mounted on this plate 147 is a housing 148. Supported by and depending from the plate 147 is a housing 149 having the openings 150 formed in the sidewalls thereof and provided with a covering 151. Mounted in this housing is a plurality of spindle driving mechanisms and in the present disclosure there is provided 10, five of the screw heads being positioned at each side of the workpiece. The construction of each of the spindles and the associated mechanisms is the same so that a description of one will suffice for all. The functioning and operation of the different spindle mechanisms is also the same. Each spindle is provided with its own motor.

In the housing 149 is a plate 152 on which is mounted a bearing 153 Fig. 8 for each of the spindles. Journaled in the bearing 153 is a spindle 154. (See Fig. 10.) A lock nut 155 is threaded on the spindle above the bearing 153 and bears against the lock washer 156. A seal cap 157 serves to retain the sealing washer 158 in position around the spindle 154. Positioned in the upper end of the spindle 154 is a guide bushing 159 retained in position by the cap 160. Extended through the spindle and projecting upwardly beyond the upper end thereof is a feeler rod 161. The upper end of the feeler rod is inserted in a bearing housing 162, having bearings 163 mounted therein and provided at its lower end with an inclined surface 164. A collar 165 is welded to the feeler rod adjacent the upper end thereof and bearing at one end of this collar 165 is a spring 166, the other end of which bears against the bushing 159 so as to normally maintain the feeler rod 161 thrust downwardly. The feeler rod 161 is also journaled in the bushing 167.

Projected upwardly from the base 168 of the housing 149, as shown in Fig. 3 and Fig. 10, is a hollow hub 169. A hub is provided for each pair of spindles. Mounted in this hub are the bearings 170 and 171 in which the spindle 154 is journaled. Secured to the under surface of the bottom of 168 is a cap 172 which encloses suitable seals around the spindle. Spline grooves 173 are formed in the lower end of the spindle and inserted in the spindle is a socket 174 having the rib or male splines 175 projecting outwardly therefrom and engaging in the grooves 173. Projected into the cap 172 and secured thereon is a sleeve 176 which serves, upon downward movement of socket 174, to engage the splines 175 and prevent the socket from falling downwardly. A spring 177 bears at its upper end against a shoulder in the spindle 154 and at its lower end against a head 178 which is slidable and which bears against the upper end of the socket 174 so as to normally maintain the socket thrust downwardly. The socket is adapted to engage the screw head SH and effect a rotation of the screw. The feeler rod 161 slidably projects through this spindle and when the screw head SH is engaged by the socket 174, the end of the feeler rod will bear against the face of the screw head SH. While the screw or stud is being driven, the screw head SH will travel downwardly in the socket and the feeler rod 161 will follow the screw head SH bearing against the face thereof.

A fluid operated motor 179 is provided for each spindle and serves to rotate the shaft 180. Mounted on the shaft 180 is a worm 181, meshing with a worm gear 182 fixedly mounted on the spindle.

Mounted on the top of the plate 147 is a plate 183 secured to the top of which and projecting upwardly therefrom is a standard 184 which is spaced from a standard 185 as shown in Fig. 3 and Fig. 10. In this description we are describing the structure for a pair of spindles and each pair of spindles has a similar construction functioning in the same manner. A shaft 186, extends through these standards 184 and 185, this shaft being rockable. This shaft carries on its end the contact 187 adapted upon rocking for moving the plunger 188 of the limit switch LS5.

Rockably mounted on the standard 185 is a shaft 189 carrying a contact 190 adapted, upon rocking of the shaft 189, for moving the plunger 191 on limit switch LS6.

Fixedly mounted on the shaft 189 is an arm 192, carrying on its lower end, as shown in Fig. 1, a roller 193, which is normally swung into engagement with the inclined surface 164 of the bearing housing 162, clearly shown in Fig. 10. A similar arm 192a is mounted on the shaft 186 and carries a roller similar to the roller 193 for engaging the inclined surface 164 of the bearing housing of the paired spindle. As shown in Fig. 1, the limit switches referred to are supported on a plate 194, supported by the cover housing 148.

As shown in Fig. 1, a pair of plates 195 and 196 are secured to the housing 149 by the brackets 197 (see Fig. 3). These plates, 195 and 196, serve as guide plates for the workpiece so that when the cradle moves upwardly the workpiece will be properly centered relatively to the spindles which are to operate upon the workpiece.

Figure 11:
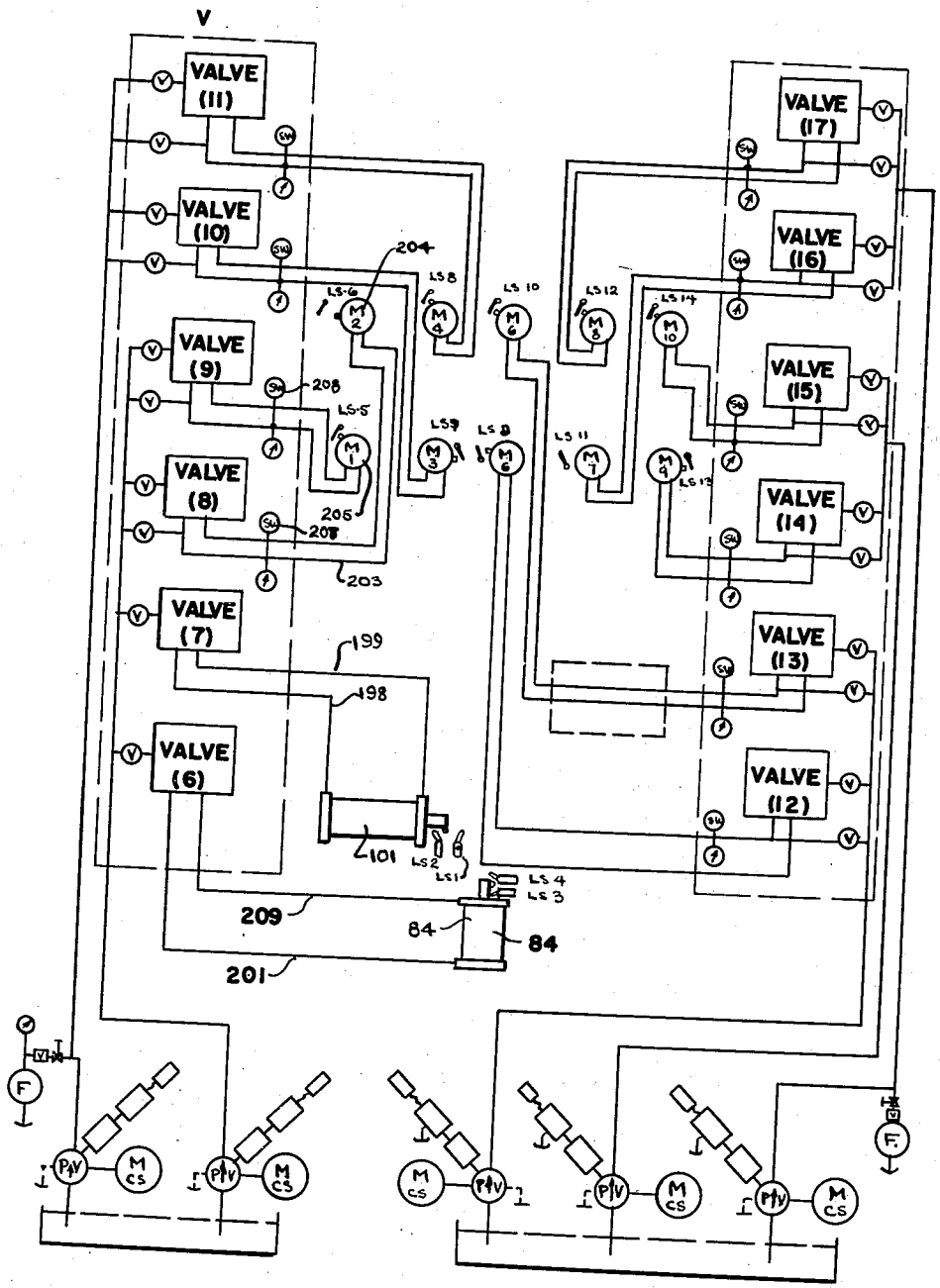
Fig. 11 is a diagrammatic view of the hydraulic system used in the invention.
Figure 15:
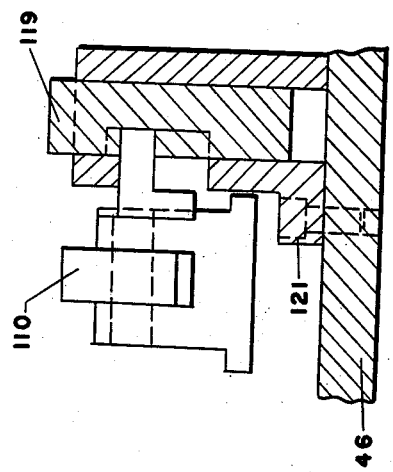
Fig. 15 is a sectional view taken on line 15—15 of Fig. 14.
Figure 14:
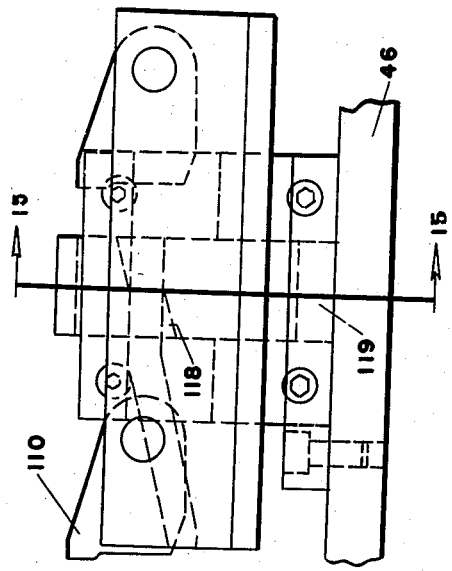
Fig. 14 is a fragmentary side elevational view of a part used in the invention.
Figure 16:
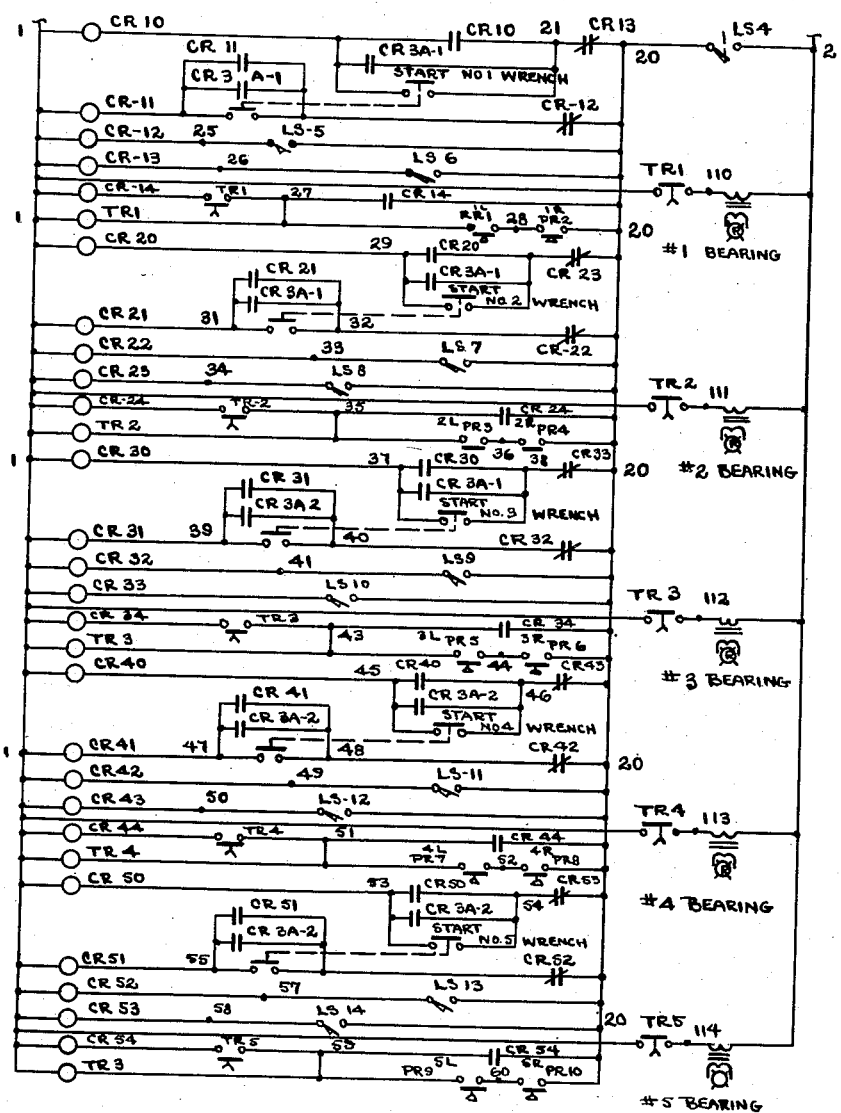
Fig. 16 and Fig. 17 are diagrammatic views of the wiring used in the invention.
Figure 17:
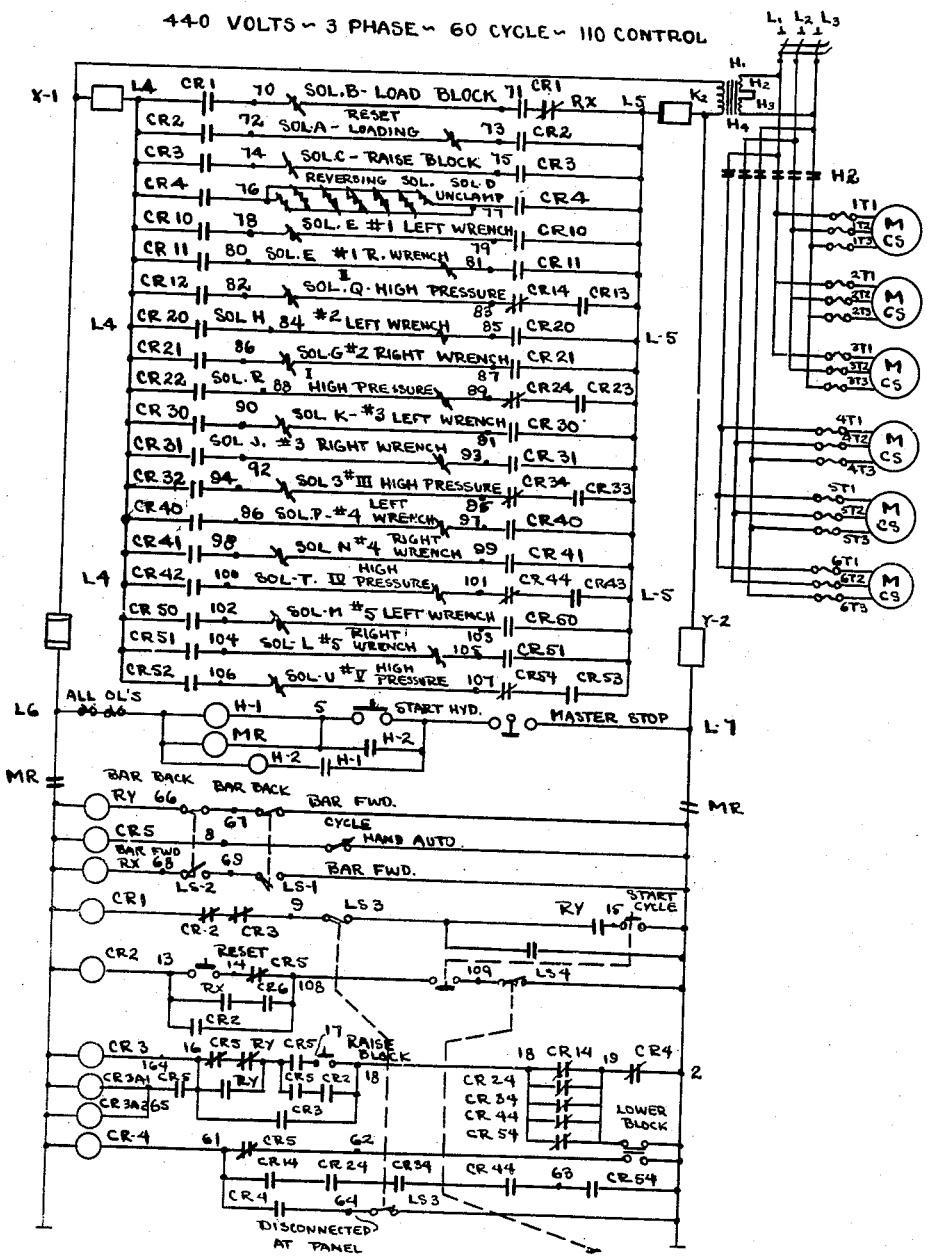

In operation the workpiece would be delivered to the position of the workpiece WP shown in Fig. 1. At this stage the operator would push the start cycle button energizing solenoid A of hydraulic valve 7, shown in the hydraulic circuit, illustrated in Fig. 11. This action causes oil under pressure to flow from the hydraulic pump 1, into the pilot part of valve 7, which results in the shifting of the main part of valve 7. Oil then flows to the piston side of cylinder 101 through line 198. This action causes the engine block to slide forward to the working position tripping LS1, shown in Fig. 1. The switch LS1 de-energizes solenoid A of valve 7 and energizes solenoid B. Oil under pressure is then admitted to the rod side of cylinder 101 through rod 199, returning slide to the reset position which is shown in full lines on Fig. 1. At the end of the reset stroke LS2 is tripped (see Fig. 6). The limit switch LS2 energizes solenoid C of the hydraulic valve 6, causing oil under pressure to be admitted to the piston side of cylinder 84 through line 201. This action raises the engine block causing the fasteners to be admitted into torquing relation to the spindle sockets tripping LS4. The limit switch LS4 energizes solenoids E, F, G, H, J, K, L, M, N and P of hydraulic valves 8, 9, 10, 11, 12, 13, 14, 15, 16 and 17, respectively. This action shifts all of the torque units into high speed, the respective valves for the spindle driving motors being in a position prior to this operation for allowing fluid to flow to the spindle driving motors in a quantity for rotating the spindles at low speed. This is accomplished by permitting oil to flow through the control valves 202 immediately upon starting the cycle. When the LS4 was energized, oil might then flow through the control valves 202 immediately upon starting the cycle. When the LS4 was energized oil might then flow through the control valves 202, for instance (9), through the line 203, so that the motor would then receive the combined flow resulting in the high speed.

When fasteners are approximately 1/16" from full position, limit switches 5 thru 14 will be tripped by their respective feeler rods.

Limit switch 5 de-energizes solenoid F of hydraulic valve 9 causing the hydraulic motor which drives the spindle to again revert to low speed getting its flow from the control valve 202.

Limit switch LS6 de-energizes solenoid E of hydraulic valve 8 permitting oil to flow to the fluid motor driving the paired spindle through valve 202, this motor being indicated by the numeral 204 and its correlative motor being indicated by the numeral 205. The limit switches LS5 and LS6 are connected in series. When both of these switches have been tripped, indicating that the paired fasteners are rotating at low speed, solenoid 206 of the two pressure variable delivery hydraulic pump #1, this action results in high pressure being applied to the hydraulic motors 204 and 205. When the torque spindles driven by hydraulic motors 204 and 205 reach a predetermined torque resistance pressure switches 207 and 208 are tripped. These two switches are in series and when tripped energize a timer permitting the spindle motors to stall at a predetermined torque resistance, determined by the pump pressure setting. It will be understood that the torque applied to the spindles through the hydraulic motors 204 and 205 can be varied by setting the pump pressure setting. After the timer times out solenoid 206 of hydraulic pump 1 is de-energized returning the pump to low pressure. In addition to this action, solenoid D of the hydraulic valve 6 and solenoid Q, R, S, T, U, V, W, X, Y, Z, of hydraulic valves 8 and so forth, are energized. It will be noted that the energizing of solenoid D of valve 6 permits oil under pressure to flow through the line 209 into the rod side of cylinder 84 causing the carrier of the cradle with workpiece WP1 to lower so as to disengage the socket wrench from the screw heads. Simultaneously with this action the energizing of solenoids Q, R, S and so on, of the hydraulic valves 8, 9, 10 and so on, causes the torque spindles to momentarily reverse by reversing the flow through the hydraulic motors driving the spindles. This reversal of the motors is instantaneous with the delivery of liquid to the operated part of cylinder 84. Consequently, the frictional engagement of the sockets with the screw heads is relieved before the downward movement of the cradle starts. It will also be noted that when the reversal of the sockets takes place this reversal is on low pressure. Thus there would be no likelihood of reversing the screw or stud or changing its torque pressure.

As the engine block is lowered LS4 is disengaged de-energizing all of the reverse solenoids. When the rod 83 of cylinder 84 returns to its lowered position, the limit switch LS3 is tripped (see Fig. 1). The tripping of this switch energizes solenoid A of hydraulic valve 7, admitting oil under pressure to the piston side of cylinder 101 to the line 198. Upon the closing of switch LS3 and the actuating of cylinder 101, the piston rod 103 will move to the left of Fig. 1, moving WP1 to the position of WP2 and moving the new workpiece WP to the position of WP1, and the cycle is then repeated.

It will thus be seen that we have produced a torquing machine whereby the workpieces may be automatically fed into the mechanism and fed out of the mechanism. The screws or studs and other parts operated upon will all be torqued simultaneously to a predetermined torque. Before lowering the workpiece the torque on the screws or studs will be released without disturbing the predetermined torque transmitted to the screws or studs.

It will be noted that the torque power of the hydraulically operated rotating means is adjusted by high pressure governing and a low pressure governing, shown in Fig. 9. The high pressure governing regulates the pressure of the flow in the hydraulic circuit to a determined degree so that the hydraulically operated motor which rotates the spindle will have a torque power equal to the predetermined torque value at which it is desired to set the threaded member.

Upon developing in the threaded member a torque resistance equal to this predetermined value, a stalling of the motor driving the spindle will take effect. It is believed obvious that a constant delivery pump or variable delivery pump may be used and that the high pressure governing may be substituted for pressure relief valve in the line inasmuch as the high pressure governing actually constitutes a pressure regulating valve.

What we claim is:

1. In a machine for threading a threaded member into a workpiece, to a predetermined torque, a rotatable wrench for engaging said member; means for rotating said wrench at variable speeds and variable torque pressure; means for moving said wrench into engagement with said member while rotating at low speed with a low torque value; means for simultaneously with the engagement of said member by said wrench in an operative relation, rotating said member at high speed with the same low torque value; means operable upon rotation of said member a predetermined amount, for reducing the rotation to a low speed and increasing the torque value to a larger amount; means operable, upon said threaded member attaining a torque response of a predetermined value, for stopping the rotation of said wrench; means for reversing said wrench immediately after the stopping of the direct rotation of the same for relieving the frictional contact between said member and said wrench; and means operable, simultaneously with the reversing of the rotation of said wrench, for moving said member out of engagement with said wrench; and means operable upon the movement of said member out of engagement with said wrench for stopping the reverse rotation of said wrench and initiating the direct rotation of same at low speed and low torque.

2. In a machine of the class described for threading a threaded member into a workpiece to a predetermined torque value, a rotatable wrench for engaging said member; means for rotating said wrench at a low speed and at a torque value; means for moving said wrench into engagement with said member; means operable upon engagement of said wrench with said member in proper operative relation for rotating said wrench at a higher speed and at a torque below said predetermined torque value; means operable upon threading of said member into said workpiece, a predetermined amount for reducing the speed of rotation of said wrench and increasing the torque power thereof to said predetermined torque value; means operable upon the development in said threaded member of a torque response equal to said predetermined torque value for stopping the direct rotation of said member; means operable upon the stopping of direct rotation of said member for reversing the rotation of said wrench for relieving frictional contact of the same with said member; and means operable simultaneously with the reverse rotation of said wrench for moving said member out of engagement with said wrench.

3. In a machine of a class described in threading a threaded member into a workpiece to a predetermined torque value, rotatable engagement means for engaging and rotating said member; means for rotating said engagement means at a low speed under torque power below said predetermined torque value; means for increasing the speed of rotation of said engagement member under torque power below predetermined torque value; means operable upon threading the said threaded member into said workpiece a predetermined distance for slowing the speed of rotation of said engagement member and raising the torque power of its rotation to a value equal to said predetermined torque value; means for stopping said rotating means upon developing in said threaded member a resistance equal to said predetermined torque value; means for, simultaneously with the stopping of rotation of said engagement means, effecting a reverse rotation of the same for relieving frictional contact of the same with said member; and means operable simultaneously upon the reverse rotation of said engagement means, for altering the relative position of said threaded member and said engagement means for effecting a disengagement of the same.

4. In a machine of the class described adapted for threading a threaded member into a workpiece to a predetermined torque value, a rotatable engagement means for engaging and rotating the threaded member; means for moving said engagement means into operative relationship to said member for effecting rotation of the same; means for rotating said engagement member at a low speed and under a torque power less than said predetermined torque value upon moving the said engagement means into operative relationship with said member; means for effecting the rotation of said member at said predetermined torque power but at increased speed immediately subsequent to the moving of such engagement means into operative relationship with said threaded member; means operable, upon threading of such threaded member into said workpiece a predetermined distance, for reducing the speed of rotation of said engagement and increasing the torque power thereof to said predetermined torque value, said rotating means being rendered ineffective upon development in said member of a torque resistance equal to said predetermined torque value; and means operable, immediately upon the rendering of said rotating means ineffective, for effecting a reverse rotation of said rotating means for relieving frictional contact of said engagement means with said member.

5. In a machine of the class described adapted for threading a threaded member into a workpiece to a predetermined torque value, a rotatable engagement means for engaging and rotating the threaded member; means for moving said engagement means into operative relationship to said member for effecting rotation of the same; means for rotating said engagement member at a low speed and under a torque power less than said predetermined torque value upon moving the said engagement means into operative relationship with said member; means for effecting the rotation of said member at said predetermined torque power but at increased speed immediately subsequent to the moving of such engagement means into operative relationship with said threaded member; means operable, upon threading of such threaded member into said workpiece a predetermined distance, for reducing the speed of said rotation of said engagement means and increasing the torque power thereof to said predetermined torque value, said rotating means being rendered ineffective upon development in said member of a torque resistance equal to said predetermined torque value; means operable, immediately upon the rendering of said rotating means ineffective, for effecting a reverse rotation of said rotating means for relieving frictional contact of said engagement means with said member; and means operable immediately upon the initiating of said reverse rotation for moving said member and said engagement means into inoperative operation.

6. In a machine of the class described adapted for threading a threaded member into a workpiece to a predetermined torque value, a rotatable engagement means for engaging and rotating the threaded member; means for moving said engagement means into operative relationship to said member for effecting rotation of the same; means for rotating said engagement member at a low speed and under a torque power less than said predetermined torque value upon moving the said engagement means into operative relationship with said member; means for effecting the rotation of said member at said predetermined torque power but at increased speed immediately subsequent to the moving of such engagement means into operative relationship with said threaded member; means operable, upon threading of such threaded member into said workpiece a predetermined distance, for reducing the speed of said rotation of said engagement means and increasing the torque power thereof to said predetermined torque value, said rotating means being rendered ineffective upon development in said member of a torque resistance equal to said predetermined torque value; means operable, immediately upon the rendering of said rotating means ineffective, for effecting a reverse rotation of said rotating means for relieving frictional contact of said engagement means with said member; means operable immediately upon the initiating of said reverse rotation for moving said member and said engagement means into inoperative operation; and means operable upon the moving of said engagement means away from said member for stopping the reverse rotation of said engagement means and initiating direct rotation of said engagement means.

7. In a machine of the class described adapted for threading a threaded member into a workpiece to a predetermined torque value, a rotatable engagement means for engaging and rotating the threaded member; means for moving said engagement means into operative relationship to said member for effecting rotation of the same; means for rotating said engagement means at a low speed and under a torque power less than said predetermined torque value upon moving the said engagement means into operative relationship with said member; means for effecting the rotation of said member at said predetermined torque power but at increased speed immediately subsequent to the moving of such engagement means into operative relationship with said threaded member; means operable, upon threading of such threaded member into said workpiece a predetermined distance, for reducing the speed of said rotation of said engagement means and increasing the torque power thereof to said predetermined torque value, said rotating means being rendered ineffective upon development in said member of a torque resistance equal to said predetermined torque value; means operable, immediately upon the rendering of said rotating means ineffective, for effecting a reverse rotation of said rotating means for relieving frictional contact of said engagement means with said member; means operable immediately upon the initiating of said reverse rotation for moving said member and said engagement means into inoperative operation; means operable upon the moving of said engagement means away from said member for stopping the reverse rotation of said engagement means and initiating direct rotation of said engagement means; and means operable upon disengagement of said engagement means with said member for moving the workpiece out of operative relation to said engagement means and effecting the moving of another workpiece into position of pertaining relationship to said engagement means.

8. In a machine of the class described adapted for threading a threaded member into a workpiece to obtain a torque of a predetermined value, a slide for reception of the workpiece; means for moving said slide into position relatively to said torquing mechanism; means for elevating said slide toward said torquing mechanism; an engagement means carried by said torquing mechanism for engagement with said threaded member and threading the same into said workpiece; means for rotating said engagement means; means for regulating the speed of rotation and the torque power of said engagement means upon engagement of same with said member; means for increasing the speed for rotation of said rotating means subsequent to engagement of said engagement means with said member; means operable upon rotation of said member a predetermined amount for increasing the speed of rotation of said engagement means; means operable upon rotation of said means a predetermined amount for slowing the speed of rotation of the same and increasing the torque power of the rotating means; and means operable upon rotation of said member a predetermined distance for stopping said rotating means.

9. In a machine of the class described adapted for threading a threaded member into a workpiece to obtain a torque resistance of predetermined value, a longitudinally movable slide for reception of a workpiece; a torquing mechanism; engagement means carried by said torquing mechanism for engaging with said threaded member for threading same into said workpiece; means for moving said slide toward said torquing mechanism upon movement of said slide to a predetermined position; means for increasing the speed of said torquing mechanism upon engagement of said engagement means by said member; and means for lowering the speed of said engagement means and increasing the torque power thereof upon threading of said threaded member into said workpiece a predetermined distance.

10. In a machine of the class described adapted for use in threading a threaded member into a workpiece to obtain a torque resistance of a predetermined value, a longitudinally movable slide for reception of a workpiece; a torquing mechanism comprising a rotatable engagement means for engaging said threaded member; means for moving said slide into a predetermined position for locking said workpiece relatively to said torquing mechanism; means for moving said slide toward said torquing mechanism for engaging said movable member with said rotatable engagement means; means for rotating said rotatable means upon engagement of the same with said member at a predetermined speed and with a torque power less than said torque value; means for increasing the speed of rotation of said rotatable means, subsequent to the engagement of said engagement means with said threaded member; means for lowering the speed of rotation of said engagement means upon threading of said threadable member into said workpiece a predetermined distance and increasing the torque power of said rotatable engaging means; and means for stopping the rotation of said engageable means upon development in said threaded member of a torque resistance of said predetermined value.

11. In a machine of the class described adapted for use in threading a threaded member into a workpiece to obtain a torque resistance of a predetermined value, a longitudinally movable slide for reception of a workpiece; a torquing mechanism comprising a rotatable engagement means for engaging said threaded member; means for moving said slide into a predetermined position for locking said workpiece relatively to said torquing mechanism; means for moving said slide toward said torquing mechanism for engaging said movable member with said rotatable engagement means; means for rotating said rotatable engagement means upon engagement of the same with said member at a predetermined speed and with a torque power less than said torque value; means for increasing the speed of rotation of said rotatable means, subsequent to the engagement of said engagement means with said threaded member; means for lowering the speed of rotation of said engagement means upon threading of said threadable member into said workpiece a predetermined distance and increasing the torque power of said rotatable engaging means; means for stopping the rotation of said engagement means upon development in said threaded member of a torque resistance equal to said predetermined value; and means for reversing the rotation of said engagement means upon the stopping of the direct rotation thereof.

12. In a machine of the class described adapted for use in threading a threaded member into a workpiece to obtain a torque resistance of a predetermined value, a longitudinally movable slide for reception of a workpiece; a torquing mechanism comprising a rotatable engagement means for engaging said threaded member; means for moving said slide into a predetermined position for locking said workpiece relatively to said torquing mechanism; means for moving said slide toward said torquing mechanism for engaging said member with said rotatable engagement means; means for rotating said rotatable engagement means, upon engagement of the same with said member, at a predetermined speed and with a torque power less than said torque value; means for increasing the speed of rotation of said rotatable means, subsequent to the engagement of said engagement means with said threaded member; means for lowering the speed of rotation of said engagement means upon threading of said threadable member into said workpiece a predetermined distance and increasing the torque power of said rotatable engagement means; means for stopping the rotation of said engagement means upon development in said threaded member of a torque resistance equal to said predetermined value; and means for moving said workpiece from said engagement means simultaneously with the reverse rotation of said engagement means.

13. In a machine of the class described adapted for use in threading a threaded member into a workpiece to obtain a torque resistance of a predetermined value, a longitudinally movable slide for reception of a workpiece; a torquing mechanism comprising a rotatable engagement means for engaging said threaded member; means for moving said slide into a predetermined position for locking said workpiece relatively to said torquing mechanism; means for moving said slide toward said torquing mechanism for engaging said member with said rotatable engagement means; means for rotating said rotatable engagement means upon engagement of the same with said member at a predetermined speed and with a torque power less than said torque value; means for increasing the speed of rotation of said rotatable engagement means, subsequently to the engagement of same with said threaded member; means for lowering the speed of rotation of said engagement means upon threading of said threadable member into said workpiece a predetermined distance and increasing the torque power of said rotatable engagement means; means for stopping the rotation of said engagement means upon development in said threaded member of a torque resistance equal to said predetermined value; and means operable upon the movement of said engagement means away from said member for moving said slide to transfer said workpiece to a new position and replace the same with a new workpiece.

14. In a machine of the class described adapted for use in threading a threaded member into a workpiece to obtain a torque resistance of a predetermined value, a longitudinally movable slide for reception of a workpiece; a torque mechanism comprising a rotatable engagement means for engaging said threaded member; means for moving said slide into a predetermined position for locking said workpiece relatively to said torquing mechanism; means for moving said slide toward said torquing mechanism for engaging said member with said rotatable engagement means; means for rotating said rotatable means, upon engagement of the same with said member, at a predetermined speed and with a torque power less than said torque value; means for increasing the speed of rotation of said rotatable engagement means, subsequent to the engagement of same with said threaded member; means for lowering the speed of rotation of said engagement means upon threading of said threadable member into said workpiece a predetermined distance and increasing the torque power of said rotatable engagement means; and means for stopping the rotation of said engagement means upon development in said threaded member of a torque resistance equal to said predetermined value.

15. In a torquing machine for threading a threaded member into a workpiece, gripping means for engaging said member; hydraulically operated means for rotating said gripping means for threading said member into said workpiece; means for stopping the rotation of said gripping means upon developing in said member a torque resistance equal to the torque power of said rotating means, and means for effecting an operation of said rotating means in a reverse direction immediately upon said stopping of said rotating means.

16. In a torquing machine of the class described for threading a threaded member into a workpiece to a predetermined torque value, gripping means for gripping said threaded member, hydraulically operated rotating means for rotating said gripping means; a hydraulic circuit for delivering liquid under pressure to said rotating means, a pump for delivering liquid into said circuit; and means for regulating the pressure of the liquid delivered into said circuit for determining the torque power of said rotating means at a torque value substantially the same as said predetermined torque value so as to stall the rotating means upon developing in said member a torque resistance substantially equal to said predetermined torque value, and the means operable upon the stalling of said rotating means for reversing the direction of said rotating means.

17. In a torquing machine of the class described for threading a threaded member into a workpiece to a predetermined torque value, gripping means for gripping said threaded member, hydraulically operated rotating means for rotating said gripping means; a hydraulic circuit for delivering liquid under pressure to said rotating means, a pump for delivering liquid into said circuit; and means for regulating the pressure of the liquid delivered into said circuit for determining the torque power of said rotating means at a torque value substantially the same as said predetermined torque value so as to stall the rotating means upon developing in said member a torque resistance substantially equal to said predetermined torque value, and means simultaneously operable, upon the stalling of said rotating means, for reducing the pressure in said hydraulic circuit for effecting a reverse rotation of said rotating means.

References Cited in the file of this patent

UNITED STATES PATENTS

| | | |
|---|---|---|
| 2,292,146 | Meunier | Aug. 4, 1942 |
| 2,360,059 | Hohwart | Oct. 10, 1944 |
| 2,600,549 | Ledbetter | June 17, 1952 |
| 2,616,323 | Leifer | Nov. 4, 1952 |
| 2,616,324 | Bailey et al. | Nov. 4, 1952 |
| 2,627,770 | Hautau et al. | Feb. 10, 1953 |
| 2,649,870 | Keilien et al. | Aug. 25, 1953 |
| 2,651,228 | Taylor | Sept. 8, 1953 |
| 2,663,334 | Tinsman et al. | Dec. 22, 1953 |
| 2,700,443 | Boice | Jan. 25, 1955 |
| 2,720,803 | Rice et al. | Oct. 18, 1955 |